April 8, 1947.    R. W. GROOT    2,418,707
LUBRICANT SEAL
Filed May 27, 1944
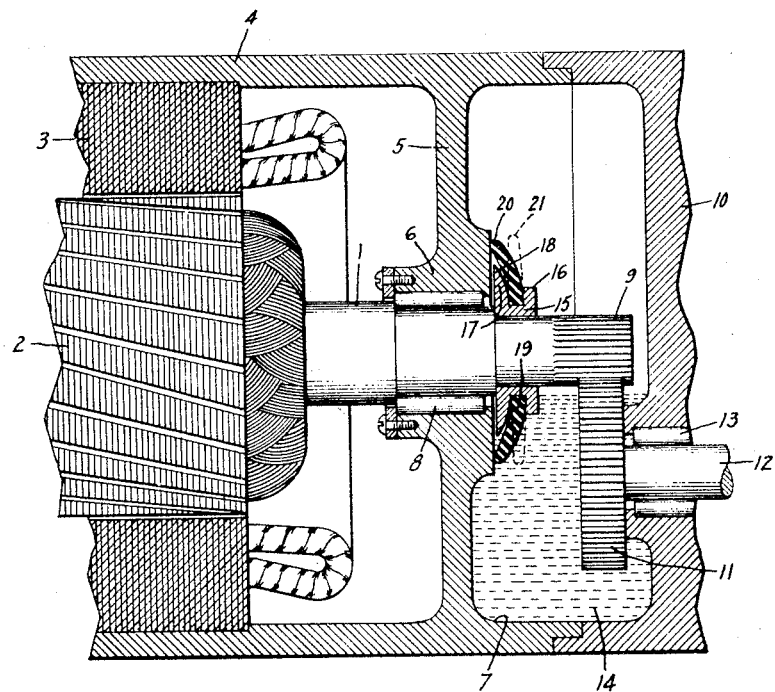
Inventor:
Robert W. Groot,
by Harry E. Dunham
His Attorney.

"Patented Apr. 8, 1947"

UNITED STATES PATENT OFFICE 2,418,707

LUBRICANT SEAL

Robert W. Groot, Fort Wayne, Ind., assignor to General Electric Company, a corporation of New York Application May 27, 1944, Serial No. 537,605

3 Claims. (Cl. 286—7)

This application relates to seals particularly adaptable for preventing the passage of a fluid, such as a lubricant, along a rotatable member which extends through an opening in a wall.

An object of my invention is to provide an improved fluid seal for a rotatable member which extends through a wall.

Another object of my invention is to provide an improved lubricant seal for a rotatable shaft which extends through a wall, in which the seal is arranged in positive lubricant sealing engagement with the wall when the shaft is stationary and which is deflected out of engagement with the wall when the shaft is rotated to provide a slinger type seal.

Further objects and advantages of my invention will be better understood from the following description referring to the accompanying drawing, and the features of novelty which characterize my invention will be pointed out with particularity in the claims annexed to and forming part of this specification.

The drawing is a sectional view of an embodiment of my invention applied to a motor shaft projection which extends from a bearing housing wall into a gear casing and lubricant reservoir.

Referring to the drawing, I have shown an embodiment of my improved fluid seal applied to a rotatable shaft 1 of the rotatable member 2 of a dynamoelectric machine which is provided with a stationary member 3 supported in a casing 4 having an end wall 5 which forms a bearing housing 6 from which the shaft 1 projects into a lubricant reservoir 7 formed in the lower portion of a gear casing. The shaft 1 is supported on the end wall 5 by bearings 8 arranged in the bearing housing 6 and is formed with spur gear teeth 9 on the outer end portion which extends from the wall 5 into the gear casing formed between the wall 5 and a gear casing wall 10. Power is adapted to be transmitted from the motor rotatable member 2 through the shaft 1 to a driven gear 11 which engages the spur gear 9 on the shaft 1 and which is mounted on a driven shaft 12 supported by bearings 13 mounted in the gear casing wall 10. The gears are lubricated by lubricant 14 which partially fills the gear casing and is carried by the teeth of the driven gear 11 to the teeth of the motor shaft gear 9. In order to prevent the passage of lubricant along the rotatable member shaft 1 out of the gear casing, I provide a lubricant seal which includes a mounting member formed with a hub 15 and secured to the projecting portion of the shaft 1 adjacent the gear casing side of the wall 5. A short flange 16 is formed on the outer side of the hub 15 and a slightly longer supporting flange 17 is formed on the hub adjacent and overlapping the wall 5. This flange is wider at its base than at its outer edge and has its outer surface curved toward the bearing housing wall. A flexible member 19 is secured to the rotatable member shaft 1 between the flanges 16 and 17 of the mounting member and is formed of a flexible resilient lubricant resistant material, such as a synthetic rubber which is not deleteriously affected by lubricant, and extends over the curved surface of the flange 17 forming a dish-shaped contour inclined to the flange so that the outer edge 20 is in positive fluid lubricant sealing engagement with the bearing housing wall when the shaft is at a standstill, thereby effectively preventing the passage of lubricant from the lubricant reservoir along the shaft by the positive engagement of the sealing member 19 with the lubricant reservoir wall. The flexible member 19 is formed of a material having such flexibility as to be deflected outwardly under centrifugal force out of engagement with the bearing housing wall, as indicated by the dotted lines 21, when it is rotated above a predetermined speed, thereby providing a slinger type fluid lubricant seal which effectively prevents the passage of lubricant along the rotatable member shaft 1 when this shaft is rotated and thus also minimizes the friction of the flexible sealing member 19 in contact with the adjacent lubricant reservoir wall 5. Flange 17 obviously forms a part of this seal and will throw centrifugally any lubricant which may pass around the outer edge 20 of the flexible member when in the deflected position.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A fluid seal for a rotatable shaft extending through a wall having one surface exposed to a fluid, said seal including a member secured to said shaft on the fluid side of said wall and having an annular flange adjacent and overlapping said wall, said flange having the base of its surface remote from said wall spaced axially therefrom, said flange surface being curved toward said wall, and an annular flexible sealing member secured to said member on the side of said flange remote from said wall and conforming to the curved surface of said flange so that its outer edge extends into sealing engagement with said wall when said shaft is at a standstill whereby passage of fluid from the fluid side of said wall along said shaft through said wall is prohibited, said sealing member being of such flexibility as to be deflected by centrifugal force out of engagement with said wall and away from said flange in response to rotation of said shaft whereby said sealing member in its deflected position acts directly as a fluid slinger to throw centrifugally away from said wall the fluid that passes along said shaft from the fluid side of said wall and said flange is enabled to serve as a supplemental fluid slinger to throw centrifugally any fluid which passes around said sealing member.

2. A fluid seal for a rotatable shaft extending through a wall having one surface exposed to a fluid, said seal including a mounting member secured to said shaft on the fluid side of said wall and having a hub and an annular flange, said flange having an inner surface adjacent and overlapping said wall and an outer surface curved toward said wall, and an annular flexible sealing member secured to said hub on the side of said flange remote from said wall and conforming to the curved surface of said flange so that its outer edge extends into sealing engagement with said wall when said shaft is at a standstill whereby passage of fluid from the fluid side of said wall along said shaft through said wall is prohibited, said sealing member being of such flexibility as to be deflected by centrifugal force out of engagement with said wall and away from said flange in response to rotation of said shaft whereby said sealing member in its deflected position acts directly as a fluid slinger to throw centrifugally away from said wall the fluid that passes along said shaft from the fluid side of said wall and said flange is enabled to serve as a supplemental slinger to throw centrifugally any fluid which passes around said sealing member.

3. A fluid seal for a rotatable shaft extending through a wall having one surface exposed to a fluid, said seal including a mounting member secured to said shaft on the fluid side of said wall, said mounting member having two annular flanges defining a hub therebetween, one of said flanges being adjacent and overlapping said wall and having the base of its surface remote from said wall spaced axially therefrom, said flange surface being curved toward said wall, and an annular flexible sealing member secured to said hub of said mounting member and conforming to the curved surface of said flange so that its outer edge extends into sealing engagement with said wall when said shaft is at a standstill whereby passage of fluid from the fluid side of said wall along said shaft through said wall is prohibited, said sealing member being of such flexibility as to be deflected by centrifugal force out of engagement with said wall and away from said flange in response to rotation of said shaft whereby said sealing member in its deflected position acts directly as a fluid slinger to throw centrifugally away from said wall the fluid that passes along said shaft from the fluid side of said wall and said flange is enabled to serve as a supplemental slinger to throw centrifugally any fluid which passes around said sealing member.

ROBERT W. GROOT.

REFERENCES CITED

The following references are of record in the file of this patent:

UNITED STATES PATENTS

| Number | Name | Date |
|---|---|---|
| 2,076,747 | Salisbury | Apr. 13, 1937 |
| 2,140,356 | Gutmann | Dec. 13, 1938 |
| 2,144,691 | Schmal | Jan. 24, 1939 |
| 1,166,201 | Fritchle | Dec. 28, 1915 |
| 1,337,881 | Bott | Apr. 20, 1920 |
| 2,171,968 | Augustin | Sept. 5, 1939 |

FOREIGN PATENTS

| Number | Country | Date |
|---|---|---|
| 411,419 | British | 1932 |
| 460,671 | British | 1937 |